(12) United States Patent
Kandaswamy et al.

(10) Patent No.: US 9,178,844 B2
(45) Date of Patent: Nov. 3, 2015

(54) METHOD AND SYSTEM FOR ASSOCIATING A SOCIAL NETWORKING IDENTIFIER WITH A NETWORK SUBSCRIBER ACCOUNT

(71) Applicant: Verizon Patent and Licensing Inc., Basking Ridge, NJ (US)

(72) Inventors: Ashok Kandaswamy, Irving, TX (US); Leena Naidu, Irving, TX (US); Jesus Martinez, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 13/748,298

(22) Filed: Jan. 23, 2013

(65) Prior Publication Data

US 2014/0207877 A1 Jul. 24, 2014

(51) Int. Cl.
*H04L 12/58* (2006.01)
(52) U.S. Cl.
CPC ............... *H04L 51/24* (2013.01); *H04L 51/32* (2013.01)
(58) Field of Classification Search
CPC .................................................... H04L 12/588
See application file for complete search history.

(56) References Cited

U.S. PATENT DOCUMENTS

| | | | |
|---|---|---|---|
| 2012/0197976 A1* | 8/2012 | Welingkar et al. | 709/203 |
| 2012/0317198 A1* | 12/2012 | Patton et al. | 709/204 |
| 2013/0074118 A1* | 3/2013 | Gupta et al. | 725/32 |
| 2013/0074159 A1* | 3/2013 | Lin et al. | 726/4 |
| 2013/0227006 A1* | 8/2013 | Raju | 709/204 |
| 2013/0290444 A1* | 10/2013 | Billings et al. | 709/206 |
| 2013/0304830 A1* | 11/2013 | Olsen et al. | 709/206 |
| 2014/0082705 A1* | 3/2014 | Robinson et al. | 726/4 |

* cited by examiner

*Primary Examiner* — Brian J Gillis
*Assistant Examiner* — Javier O Guzman

(57) ABSTRACT

An approach for enabling delivery and presentment of service provider notification messages to a subscribed user via a social networking service of the user is described. An integration platform determines whether a network identifier for accessing a social networking service via a communication network is associated with subscriber account information maintained by the communication service provider. The integration platform also generates a request for linking a social networking identifier associated with the social networking service with the subscriber account information based on the determination. The integration platform further initiates a rendering of a notification message received from the communication service provider to a user interface of the social networking service based on acceptance of the request.

16 Claims, 11 Drawing Sheets

100

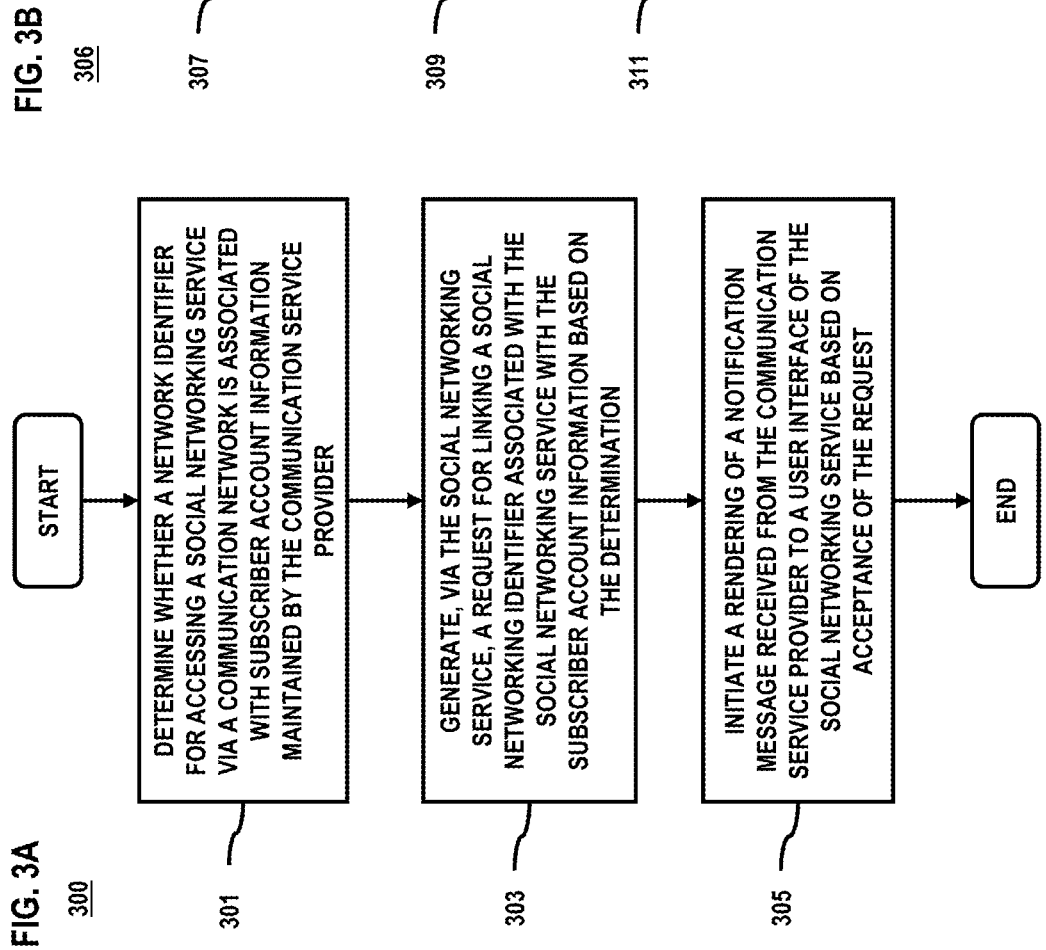

316

312

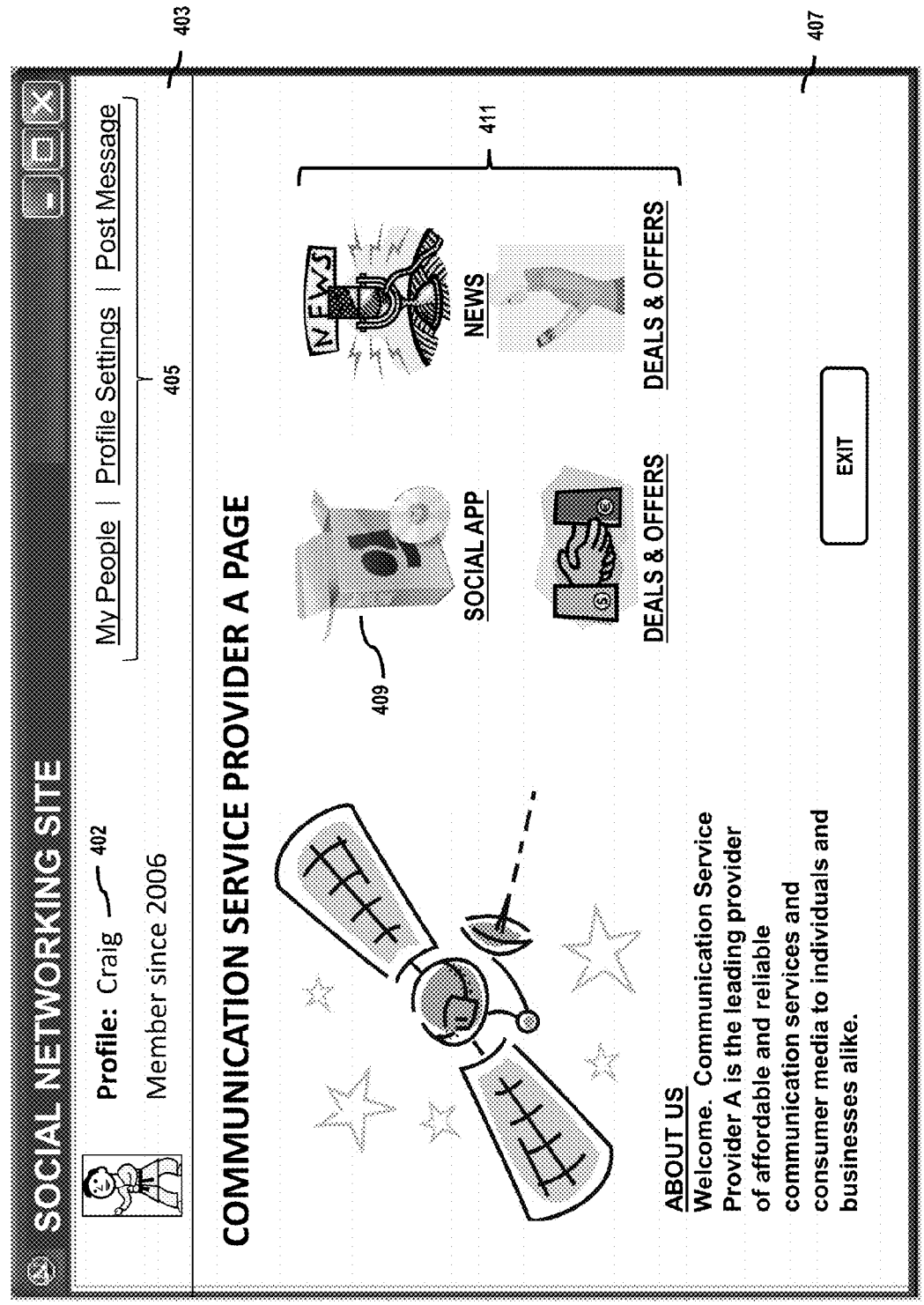

600

METHOD AND SYSTEM FOR ASSOCIATING A SOCIAL NETWORKING IDENTIFIER WITH A NETWORK SUBSCRIBER ACCOUNT

BACKGROUND INFORMATION

Service providers are continually challenged to deliver value and convenience to consumers by providing compelling network services and advancing the underlying technologies. One area of interest has been providing users with convenient access to service related notification messages. Typically, users subscribed with the service provider utilize the network to access services such as social networking services and shared media platforms to communicate with friends, family and acquaintances. The users may also access subscriber related notification messages such as billing notices or product offers by way of a customer service portal. Unfortunately, each of these different services or portals is independent, and therefore requires an individual login in order to be accessed by the user.

Based on the foregoing, there is a need for enabling delivery and presentment of service provider notification messages to a subscribed user via a social networking service of the user.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for enabling delivery and presentment of service provider notification messages to a subscribed user via a social networking service of the user, according to various embodiments;

FIGS. 4A-4E are diagrams of user interfaces for depicting device interaction with the integration platform of FIG. 2, according to various embodiments;

DESCRIPTION OF THE PREFERRED EMBODIMENT

An apparatus, method and software for enabling delivery and presentment of service provider notification messages to a subscribed user via a social networking service of the user is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
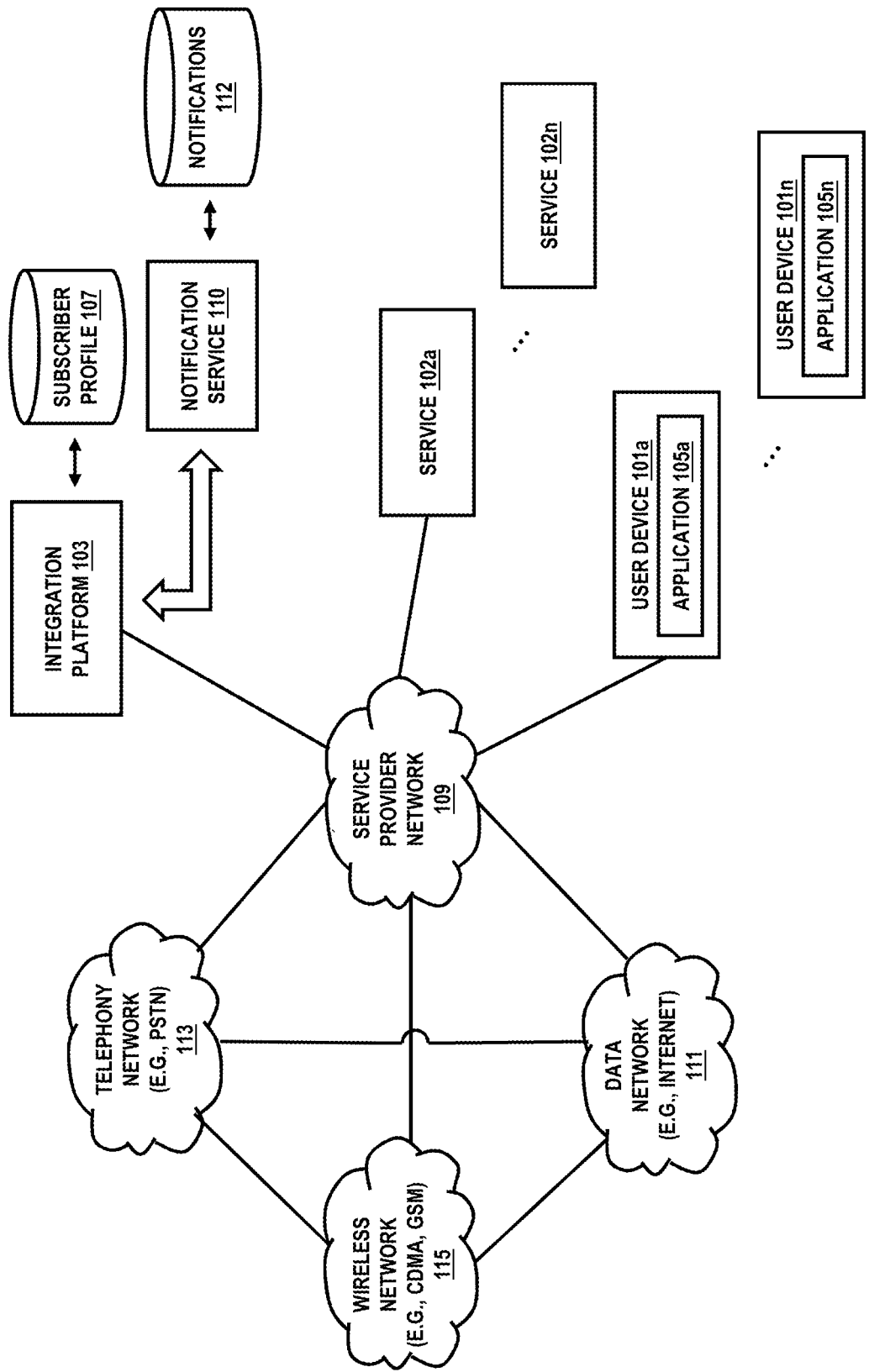
FIG. 1 is a diagram of a system for enabling delivery and presentment of service provider notification messages to a subscribed user via a social networking service of the user, according to one embodiment.

FIG. 1 is a diagram of a system for enabling delivery and presentment of service provider notification messages to a subscribed user via a social networking service of the user, according to one embodiment. For the purpose of explanation, system 100 is shown to include one or more user devices 101a-101n (e.g., mobile device, smart phone, netbook, laptop, set-top box or any communications enabled computing device). The user devices 101a-101n, referred to herein collectively as user devices 101, are configured to communicate with one another as well as one or more services 102a-102n. The services may include, for example, a social networking service, a shared media platform or any other user interaction platform. The system 100 may include, for example, a service provider network 109 as maintained by a communication service provider, data network provider, or the like.

In this example, users subscribed to the network 109 can utilize the different services 102a-102n to communicate and exchange data (e.g., photos, media) with friends, family and acquaintances. In addition, the users may also occasionally access billing notices, account information, product offers and the like as related to the provider of the network 109 by way of, e.g., an online customer portal or via an email service. Hence, relevant information pertaining to the user from the provider is accessed independently from the services 102a-102n the user often employs. Resultantly, the user must perform a separate login to access the different services or portals, which requires additional time and effort on the part of the user. Unfortunately, there is currently no convenient means of enabling delivery and presentment of service provider notification messages to a subscribed user via a social networking service frequently employed by the user.

To address this issue, system 100 presents an integration platform 103 that operates in connection with user devices 101 to support the integrating, or associating, of messages generated by a provider of a service provider network 109 with designated services 102a-102n (referred to herein collectively as services 102). By way of example, the integration platform 103 the integration platform 103 enables the service, i.e., a social networking service, and subscription information to the network 109 to be seamlessly linked during normal use of the service 102. In addition, the integration platform 103 supports execution of one or more application programming interfaces (APIs) for rendering the messages via a user interface of a service 102 of the user. By way of these approaches, limited user interaction is required for supporting the rendering of provider based notification messages via a service of the user. Furthermore, this eliminates the need for the user to access or login to a separate customer portal or other service in order to retrieve relevant provider notification messages.

In one embodiment, the integration platform 103 facilitates a permanent linking of the subscriber profile 107 maintained by the provider of the network 109 with the profile maintained by the service 102. The linking is based on a common user, i.e., the user of the network 109 is also a registered user of a service 102. For the purpose of illustration, the services 102 are described herein as social networking services.

In another embodiment, the user device 101 operates over the service provider network 109 as per a contractual and/or subscription agreement. As such, the integration platform 103 may access the subscriber profile 107 regarding the user and/or device 101. The subscriber profile 107 may include details regarding the user, account data and/or user, service agreement data, service or device identifier information and any other data for permitting user device 101 to access the service provider network 109. It is noted the user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. Also, the user devices 101 can support any type of interface for presenting or exchanging data, including enabling the rendering of a user interface of the social networking service 102. Of note, the user interface may be generated via a social networking application configured to access the remote service 102, a browser application, or other application 105 capable of operating at the user device 101.

In another embodiment, the integration platform 103 is active as the user device 101 interacts with the social networking service 102. For example, the integration platform 103 may detect activation of the social networking service 102 via the device 101 in response to a login procedure. The login procedure may include, for example, submission of a social networking identifier (e.g., alias, handle, username) associated with the user as well as entry of a password. Once the user is logged in, the user profile corresponding to their social networking identifier is retrieved and loaded, thus enabling the user to interact with other members of the social networking service 102. The interaction may include posting messages and events, accessing pictures, visiting profile pages of other members of the social networking service 102, joining groups, etc. It is noted the user interface of the social networking service may be configured to receive, via the display of the device, various types of user input for facilitating the social networking interaction.

In yet another embodiment, the integration platform 103 may also identify if the network 109 the device 101 is using to browse the internet or access the social networking service 102 is affiliated with the provider of the network 109. Under this scenario, the integration platform 103 may look up the subscribed user's internet protocol (IP) address as specified via the browser. The platform 103 then compares the IP address against an IP address range of the provider to determine if the IP address corresponds to the service provider network 109. When the network 109 is identified as being associated with the provider, the subscriber profile 107 is retrieved based on the IP information associated with the user. It is noted the subscriber profile 107 may also be retrieved based, at least in part, on detection of a device identifier or other identification means.

Still further, in another embodiment, the integration platform 103 also requests user permission to associate/link the social networking identifier of the user with the subscriber profile 107 as retrieved. By way of example, the integration platform 103 generates a notification message for prompting user input via the user interface of the social networking service to reject or accept the request. When the user rejects the request, the social networking identifier (e.g., and associated user profile) is not associated with the subscriber profile 107. When the user accepts the request, however, the social networking identifier (e.g., and associated user profile) is associated with the subscriber profile 107. It is noted therefore, that acceptance of the request may correspond to an "opt-in" procedure for the service provider network 103 to permanently link the profiles for coordinating the transmission and delivery of notification messages to the user via the social networking service 102. Alternatively, rejection of the request corresponds to an "opt-out" procedure.

It is noted the above described account identification and linking procedure may be facilitated different ways. For example, in one embodiment, the integration platform 103 may detect the visiting of a social networking page of the provider of the network 109 by the user via the social networking service 102. The social networking page may be associated with a social networking profile established by the provider with the social networking service 102. Under this scenario, the lookup to determine if subscriber profile 107 exists for the device 101 per the service provider network 109 is executed in response to the visit. Subsequently, the request for permission to associate the subscriber profile 107 with the social networking identifier of the user is generated based on a determination that the profile exists.

In another embodiment, the integration platform 103 may detect activation of a social application. The social application may be an executable agent, widget or module that is presented for user selection (as a link) via the provider's social networking page. Alternatively, the user may download the social application from an application store (website) of the service provider. Still further, the user may learn about and subsequently download the social application based on a post generated by another user (e.g., a friend) of the social. Once invoked, the social application may call the platform 103 to initiate a lookup of the subscriber profile 107; to determine if the profile exists for the device 101 and/or user. Also, in certain implementations, the social application may be loaded into the user interface of the social networking service 102 as an embedded program or integrated/inline frame (e.g., as an iFrame or target element per a markup language specification).

In either of the above described embodiments, the integration platform 103 may execute various application programming interfaces (APIs) for interacting with the social networking service. The APIs may include instructions for rendering notification messages to request the association of the subscriber profile 107 with the social networking identifier. In addition, the APIs may include instructions for receiving/interpreting user input as submitted via the user interface of the social networking service 102.

In one embodiment, the integration platform 103 subscribes the social networking identifier (and associated social networking profile) of the user with a push notification service 110. By way of example, the subscription process is performed in response to acceptance of the request to associate the social networking identifier of the user with the subscriber profile 107. Under this scenario, the push notification service 110 is maintained by the provider of the network 109 for enabling the dissemination of notification messages 112 to the user based on the social networking identifier. Hence, once generated and stored, the push notification service 110 directs the notification messages to the social networking service 102. The integration platform 103 then renders the notification message to the user interface of the social networking service 102 accordingly.

It is noted the notification messages may be rendered to the user interface by the integration platform 103 within a designated frame or window of the user interface. As such, the notification messages may be caused to populate a section of the user interface of the social networking service 102. Alternatively, an alert may be rendered to the user interface for indicating the availability, number, or priority of the notification messages. Under this scenario, the user may activate the alert to cause a rendering of the notification messages to the user interface.

In addition to subscribing the user (via their social networking identifier) to the push notification service 110, the integration platform 103 also updates the subscriber profile 107 to enable permanent linking of the social networking identifier with the subscriber profile 107. The update may include adding a reference to the social networking identifier, a specification of the user decision to permit or not permit linking of the subscriber profile 107 with the social networking identifier (and associated social networking profile), a specification of the user decision to opt-in or opt-out, etc. It is noted that any known data storage or referencing techniques may be employed by the integration platform 103 for performing the update.

The above described embodiments provide numerous advantages to a user subscribed to the network 109. One advantage, for example, is that the user of the social networking service 102 is able to receive and view notification messages directly from their social networking service account. As such, the user is not required to independently access a customer portal, email utility or other standalone tool or service in order to retrieve notification messages from the provider. As another advantage, linking of the profile 107 with the social networking profile (via the social networking identifier) a first time ensures continual directing of notification messages to the user via the social networking service 102 thereafter. Thus, no additional linking of the communication service and the social networking service need be performed or initiated by the user; including during subsequent logging in of the user to the social networking service 102 via their social networking identifier. Still further, as another advantage, the procedure for facilitating linking of the subscriber profile information with the social networking identifier of the same user is seamless and requires minimal user interaction or manual configuration.

In certain embodiments, user devices 101, the integration platform 103, services 102 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 109 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
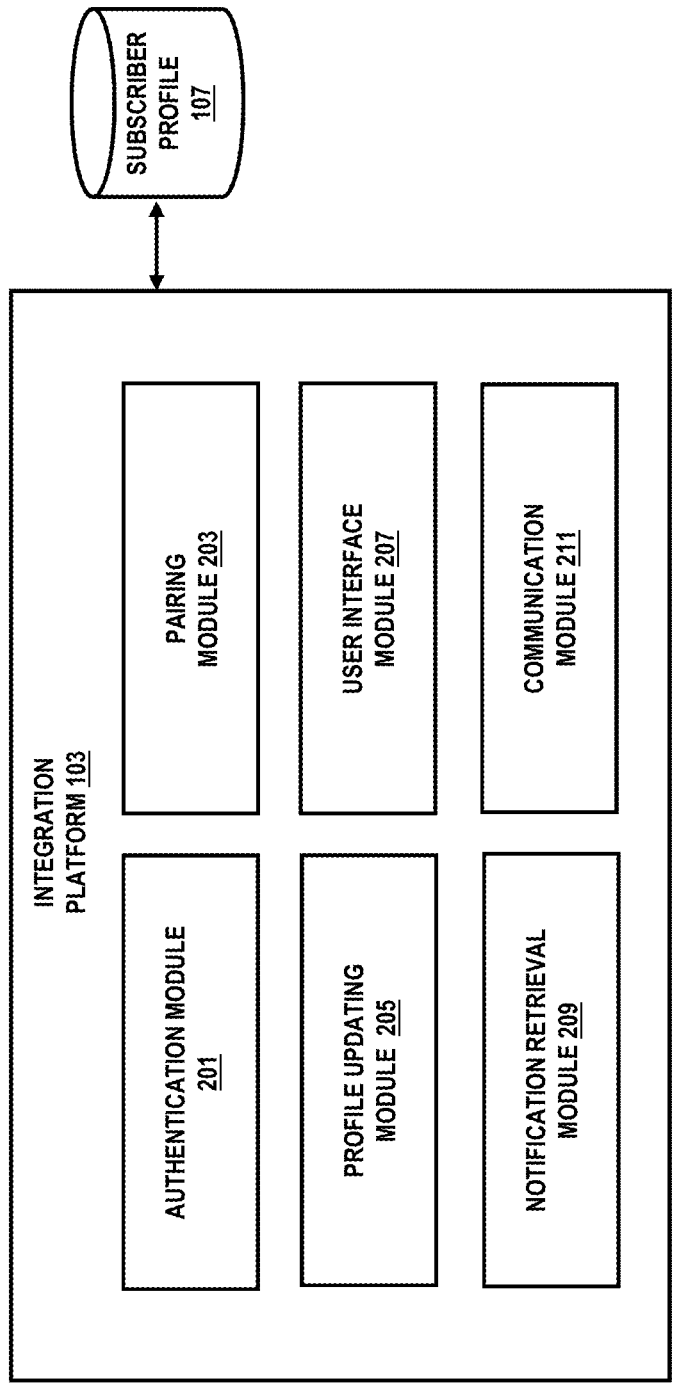
FIG. 2 is a diagram of a integration platform, according to one embodiment.
Figure 3D:
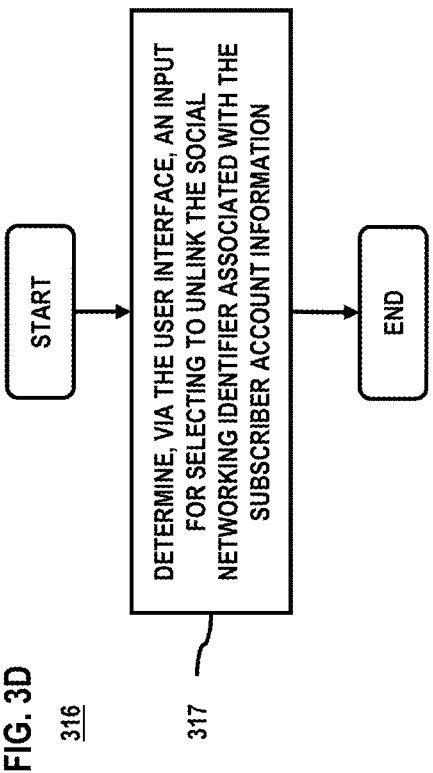
Figure 3C:
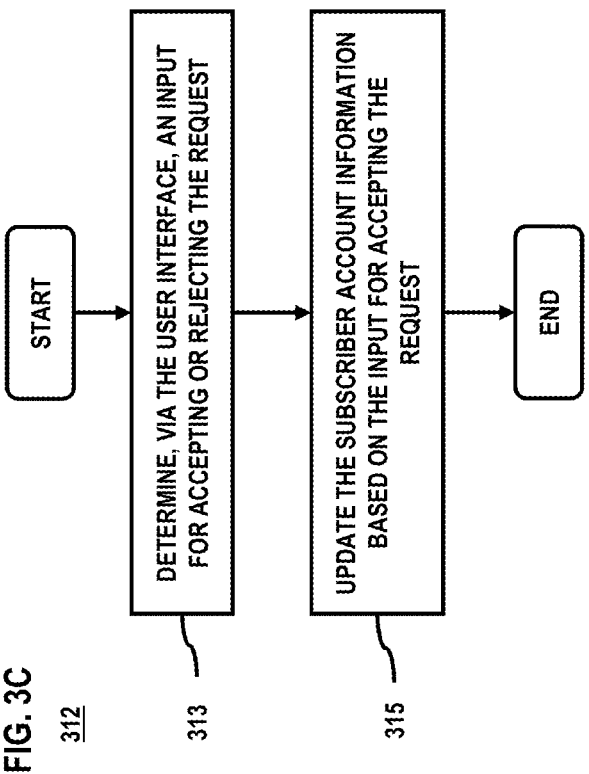

FIG. 2 is a diagram of an integration platform 103, according to one embodiment. The integration platform 103 includes executable modules for performing one or more computing, data processing and network based instructions that in combination provide a means of enabling delivery and presentment of service provider notification messages to a subscribed user via a social networking service of the user. Such modules can be implemented in hardware, firmware, software, or a combination thereof. By way of example, the integration platform 103 may include an authentication module 201, a pairing module 203, a profile updating module 205, a user interface module 207, a notification retrieval module 209 and a communication module 211. It is noted that the modules 201-211 may access subscriber profile data from database 107 to perform several of its functions.

In one embodiment, an authentication module 201 authenticates users and user devices 101a-101n for interaction with the integration platform 103. By way of example, the authentication module 201 receives a request to subscribe to the service for enabling the linking/association of a subscriber profile of a user with the user's social networking identifier/account. The subscription process may include establishing an opt-in permission to perform the linking. Preferences and settings information may be referenced to a specific user, user device, or combination thereof, and maintained as subscriber data 107.

The authentication process performed by the module 201 may also include receiving and validating a login name and/or user identification value as provided or established for a user during a subscription or registration process with the service provider. The login name and/or user identification value may be received as input provided by the user from the user device 101 or other device via a graphical user interface to the platform 103 (e.g., as enabled by user interface module 207). The subscriber profile 107 for respective user, which contains pertinent user or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

In one embodiment, the pairing module 203 determines whether a user device is configured to a network 109 of a communication service provider. By way of example, the pairing module 203 performs an IP address lookup to determine if the data network the device 101 is using to access the social networking service 102 or internet in general is associated with the provider of the network 109. This includes, for example, identifying whether the IP address falls within an IP address range of the provider. If the network is identified as being associated with the provider, the pairing module 203 then triggers execution of the user interface module 207; for generating a notification message to indicate the pairing.

Still further, the pairing module 203 may also be configured to determine an association between a subscriber profile 107 and a social networking identifier. Under this scenario, the association is based on a common user of a device 101 that is subscribed to the network 109 as well as registered with a social networking service 102 via a social networking identifier. The pairing module 203 may be triggered for execution in response to a logging in of the user to the social networking service via the social networking identifier. Once the login is performed, the pairing module 203 may again trigger execution of the user interface module 207 to generate a message for requesting permission to link the subscriber profile 107 with the identifier.

In certain embodiments, the user interface module 207 generates a notification message for prompting user permission to associate the subscriber profile 107 of the user/user device with the social networking identifier in response to the pairing module 203. Once generated, the notification message is rendered to a display of the device 101 and may include, for example, different user action buttons for receiving user input. The input may pertain to a granting or rejecting of the permission. When the input is received, the user interface module 207 then passes the input to the pairing module 203 accordingly. It is noted the user interface for presentment of the notification message may correspond to the social application, the social networking service, or a combination thereof.

In certain embodiments, the notification retrieval module 209 is triggered for execution in the case where user permission is granted. This initiates an enrolling of the device 101 for receipt of push notification messages—i.e., the push notification messages are retrieved and subsequently presented via a social networking service of the user. The notification retrieval module 209 retrieves the social networking identifier of the user and/or device 101 from the subscriber profile database 107. Alternatively, the social networking identifier is provided as an input per the notification message. Once the social networking identifier is retrieved, the notification retrieval module 209 then submits a request for enrollment of the user/device with a push notification service.

The enrollment request may specify the social networking identifier of the user as well as the specific social service to which notifications are to be sent. In addition, the request may also specify the types of notification messages to be pushed to the device. It is noted the push notification service 110 may belong to or is affiliated with the communication service provider to which the device is subscribed. As such, the push notification messages may include offers, incentives, account details or other information pertaining to the communication service provider or the subscribed user. Still further, the notification messages may be proactive troubleshooting messages for alerting the user of service or system oriented issues (e.g., a system failure).

In certain embodiments, the profile updating module 205 updates the profile information maintained in connection with the user and/or device 101 in response to the enrollment procedure. The updating includes a specification of a linking of the subscriber profile 107 with the social networking identifier. In addition, the profile information 107 may include a validation of enrollment with the push notification system (e.g., opt-in or opt-out status). By updating the profile information 107, such as during first time execution of the integration platform 103 for a device 101, the social application and the social networking service are permanently linked (unless adapted by the user subsequently). Thus, push notifications the user typically receives from the communication service provider via an independent user interface (e.g., a bill reminder or service disruption notice) are automatically presented via the interface of the social networking service. It is noted that the user interface module 207 may employ different API executions for supporting the integration and presentment of push notifications via the social networking service.

In one embodiment the user interface module 207 enables the rendering of notification messages or alerts thereof to a graphical user interface of the social networking service. By way of example, the user interface module 207 generates the interface in response to application programming interfaces (APIs) or other function calls corresponding to the browser application or web portal application of the user devices 101a-101n. In addition, the APIs may be generated by the provider of the social networking service for use in supporting the rendering of notification messages, the embedding of other programs, etc.

In one embodiment, a communication module 211 executes various protocols and data sharing techniques for enabling collaborative execution between a user device 101 (e.g., mobile devices, laptops, smartphones, tablet computers, desktop computers) and the integration platform 103 over the network 109. It is noted that the communication module 211 is also configured to support a browser session—i.e., the retrieval of content as referenced by a resource identifier during a specific period of time or usage of the browser. The browser session may support execution of the social networking service at a user device 101.

The above presented modules and components of the integration platform 103 can be implemented in hardware, firmware, software, or a combination thereof. This includes, for example, implementing the integration platform 103 as a social application for activation via a call procedure of the social networking service. Though depicted as a separate entity in FIG. 1, it is also contemplated that the integration platform 103 may be implemented for direct operation by respective user devices 101. As such, the integration platform 103 may generate direct signal inputs by way of the operating system of the user device 101 for interacting with the application 105 (e.g., browser) to access the different services 102. In another embodiment, one or more of the modules 201-211 may be implemented for operation by respective user devices, as a platform 103, or combination thereof.

FIGS. 3A-3D are flowcharts of processes for enabling delivery and presentment of service provider notification messages to a subscribed user via a social networking service of the user, according to various embodiments. In one embodiment, the integration platform 103 performs processes 300, 306, 312 and 316 and can be implemented in, for instance, via a computer of FIG. 5 or a chip set including a processor and a memory as shown in FIG. 6.

In step 301, the integration platform 103 determines whether a network identifier for accessing a social networking service via a communication network is associated with subscriber account information maintained by the communication service provider. As noted previously, the network identifier may include an internet protocol (IP) address that falls within a range of IP addresses associated with a provider of the communication network. In another step 303, the social networking service generates a request for linking a social networking identifier associated with the social networking service with the subscriber account information based on the determination. Per step 305, the platform 103 initiates a rendering of a notification message received from the communication service provider to a user interface of the social networking service based on acceptance of the request. It is noted the platform 103 operates in connection with the social networking service to enable rendering of the request, i.e., by way of one or more application programming interfaces (APIs).

In step 307 of process 306 (FIG. 3B), the integration platform 103 determines, via the user interface (of the social networking service), an input for selecting a social application associated with the communication service provider. As noted previously, the social application may include one or more application programming interfaces for supporting the rendering of notification messages via the user interface, a rendering of an alert for indicating the availability of the notification messages via the user interface, or a combination thereof. Also, as noted previously, the social application may be presented to a user of the social networking service for selection from a social networking page of the communication service provider.

In step 309, the integration platform 103 determines, based on the subscriber account information, a notification service associated with the communication service provider. In another step 311, the integration platform 103 subscribes the social networking identifier with the notification service. It is noted that the notification messages are transmitted by the notification service to the social networking service based on the subscription. Also of note, the notification messages may be generated by the communication service provider.

In step 313 of process 312 (FIG. 3C), the integration platform 103 determines via the user interface, an input for accepting or rejecting the request. As noted previously, the input is received in association with the social networking identifier, i.e., corresponding to the social network service profile of the user. In step 315, the platform 103 updates the subscriber account information based on the input for accepting the request. As mentioned above, the input may be associated with an opt-in procedure of the communication service provider, wherein the opt-in enables continual transmission of notification messages to the social networking service via the user's social networking identifier. Hence, the updated subscriber account information is retrieved automatically in response to a subsequent activation of the social networking service.

In step 317 of process 316 (FIG. 3D), the integration platform 103 determines, via the user interface, an input for selecting to unlink the social networking identifier associated with the subscriber account information. By way of example, the input may be associated with an opt-out procedure associated with the communication service provider, wherein the opt-out prevents further transmission of notification messages from the communication service provider.

FIGS. 4A-4D are diagrams of user interfaces for depicting device interaction with the integration platform, according to various embodiments. For the purpose of illustration, the diagrams are described with respect to an exemplary use case of a user activating the linking procedure from a social networking service page of their network service provider (e.g., Communication Service Provider A). For the purpose of illustration, the integration platform 103 operates in conjunction with or is activated by a social application made available to a user via the social networking page.

In FIG. 4A, the user logs into the social networking service via their social networking identifier (e.g., Craig 402). This causes the social networking service to retrieve the user profile associated with the social networking identifier. Credentials associated with the profile are, per this example, presented to the user in a frame 403 of the browser 400 along with various user selection links 405.

In another frame 407 of the browser 400, the user is presented with a social networking page of Communication Service Provider A. By way of example, the user visits the page by selecting the "My People" link from the list of selection links 405 for accessing the different social networking contacts of the user, including the service provider. Once the social networking page of the communication service provider is uploaded to the frame 407, the user may select from links 411. Under this scenario, the user selects/activates the "Social App" link 409, which initiates activation of a social application.

Figure 4B:
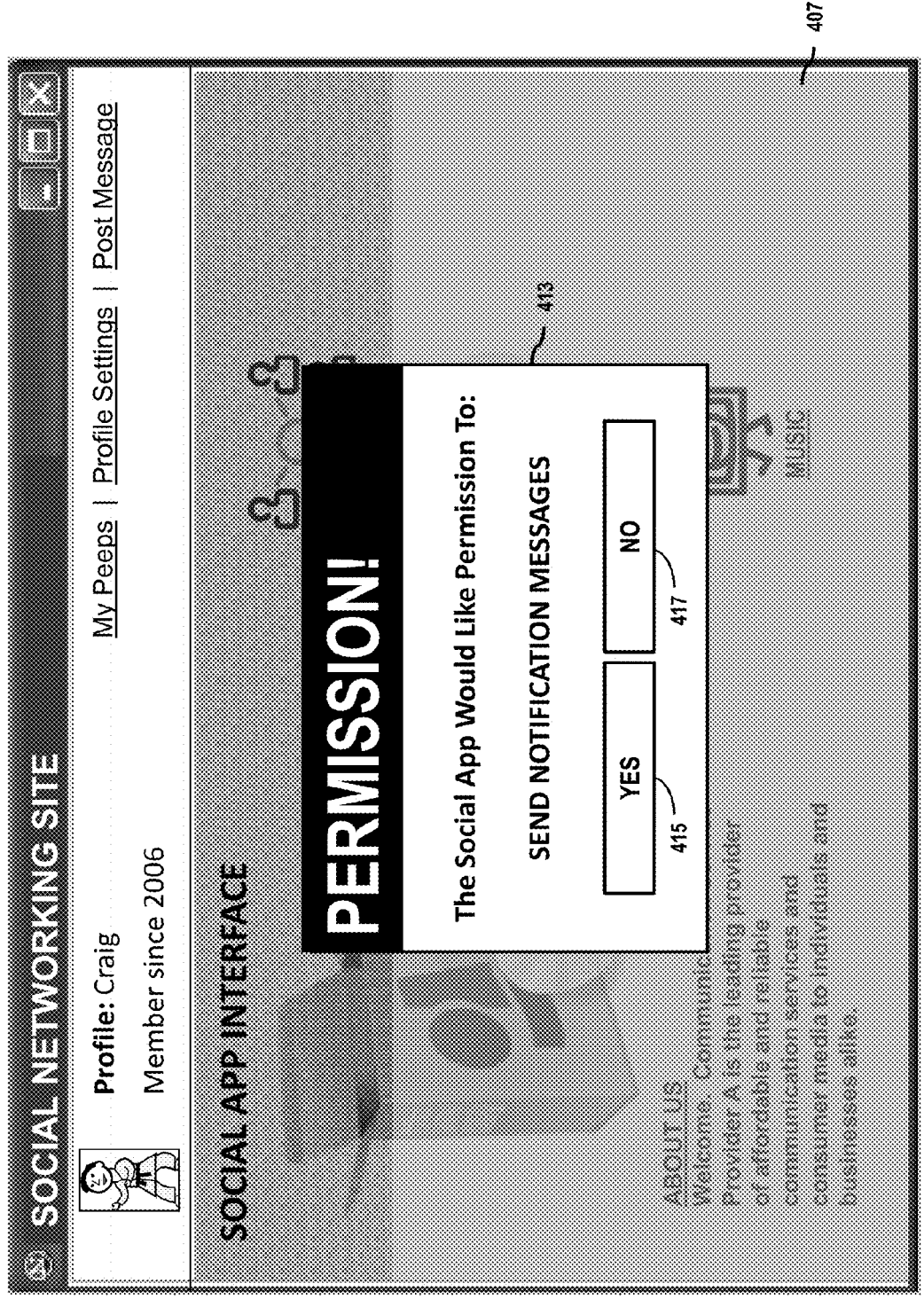

In FIG. 4B, upon selection of the "Social App" link 409, a webpage for providing details about the social application is retrieved and loaded into the frame 407. In addition, a notification message 413 for requesting user permission to allow for sending of notification messages from the communication service provider is rendered at the browser 400. The user may select a YES action button 415 to grant permission for the sending of notification messages to the user via the social networking service. This corresponds to a decision to opt-in for receipt of communication from the provider. Alternatively, the user may select a NO action button 417 to opt-out or not permit the receipt of notification messages from the provider.

Figure 4C:
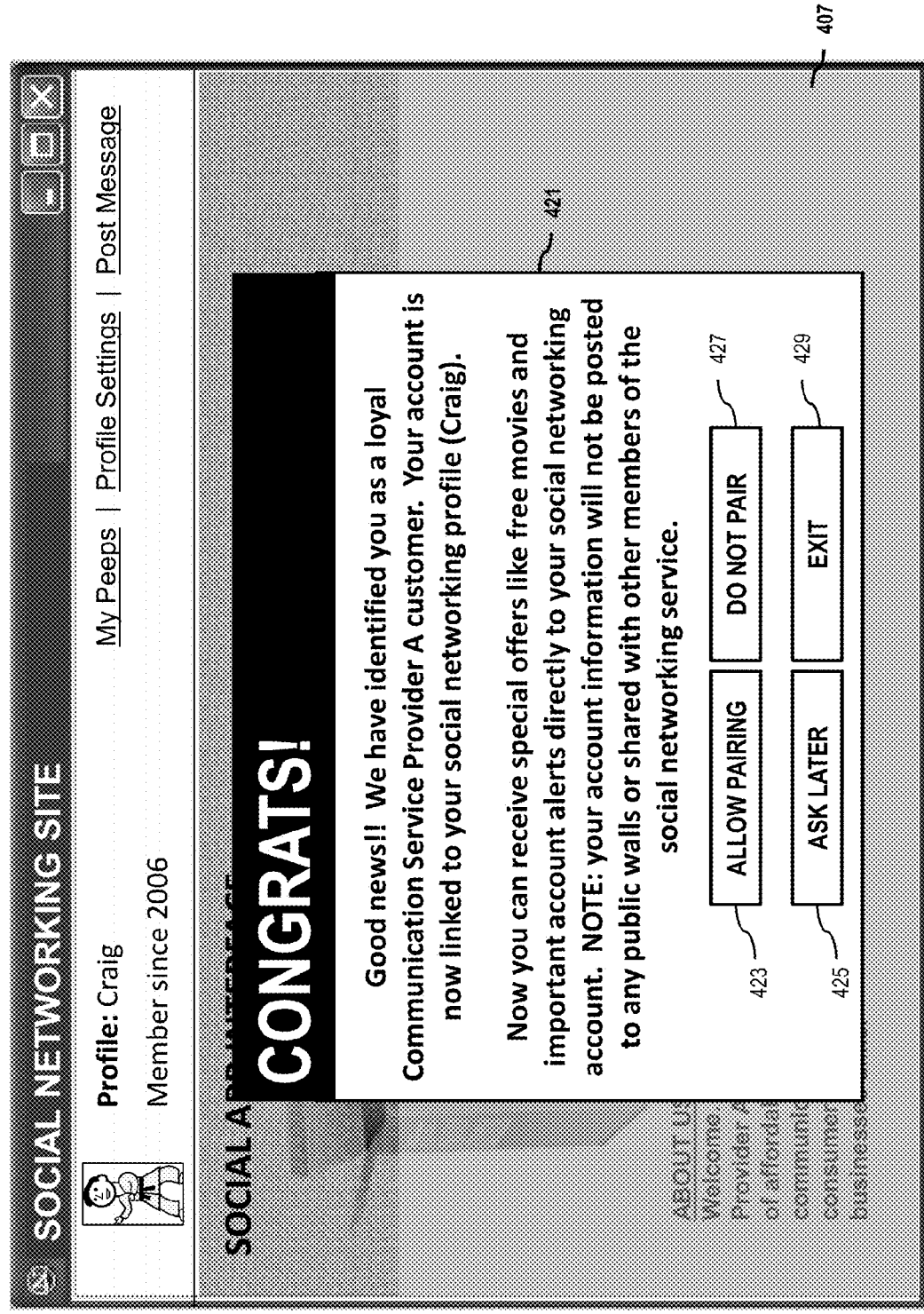

In FIG. 4C, in the case where the user grants permission for the sending of notification messages, a check is performed to determine whether the data network used to access the social networking service is associated with the communication service provider. As noted previously, this includes performing an IP address lookup and comparison against ranges assigned to the communication service provider. Once the association is determined, another notification message 421 is rendered to the browser 400 for requesting user permission to accept pairing of their communication service provider account with their social networking service account. This includes, for example, linking the subscriber profile of the user with their social networking identifier.

Under this scenario, the user is presented with action buttons 423-429 for receiving user input for responding to the permission request. The user may select the ALLOW PAIRING or DO NOT PAIR action buttons 423 and 427 respectively to either allow or not allow the pairing of the accounts. Also, the user may select a ASK LATER action button 425 to postpone the opt-in or opt-out process for another time. Still further, the user may select the EXIT action button 429 to close out the notification message (prompt) 421 and continue interacting with the social networking page of the communication service provider.

In the case where the user grants permission to link the accounts, per action button 423, this initiates an enrolling of the user associated with the subscriber profile to a push notification service of the communication service provider. The enrollment includes establishing that notification messages be directed to the user by way of the social networking identifier. In addition, the subscriber profile for the user is updated accordingly to indicate the linking of the subscriber profile with the social networking identifier. It is noted that upon acceptance the user is able to receive notifications from Communication Service Provider A directly via their social networking service profile without having to subsequently/independently login to a customer portal or other platform of the service provider.

Figure 4D:
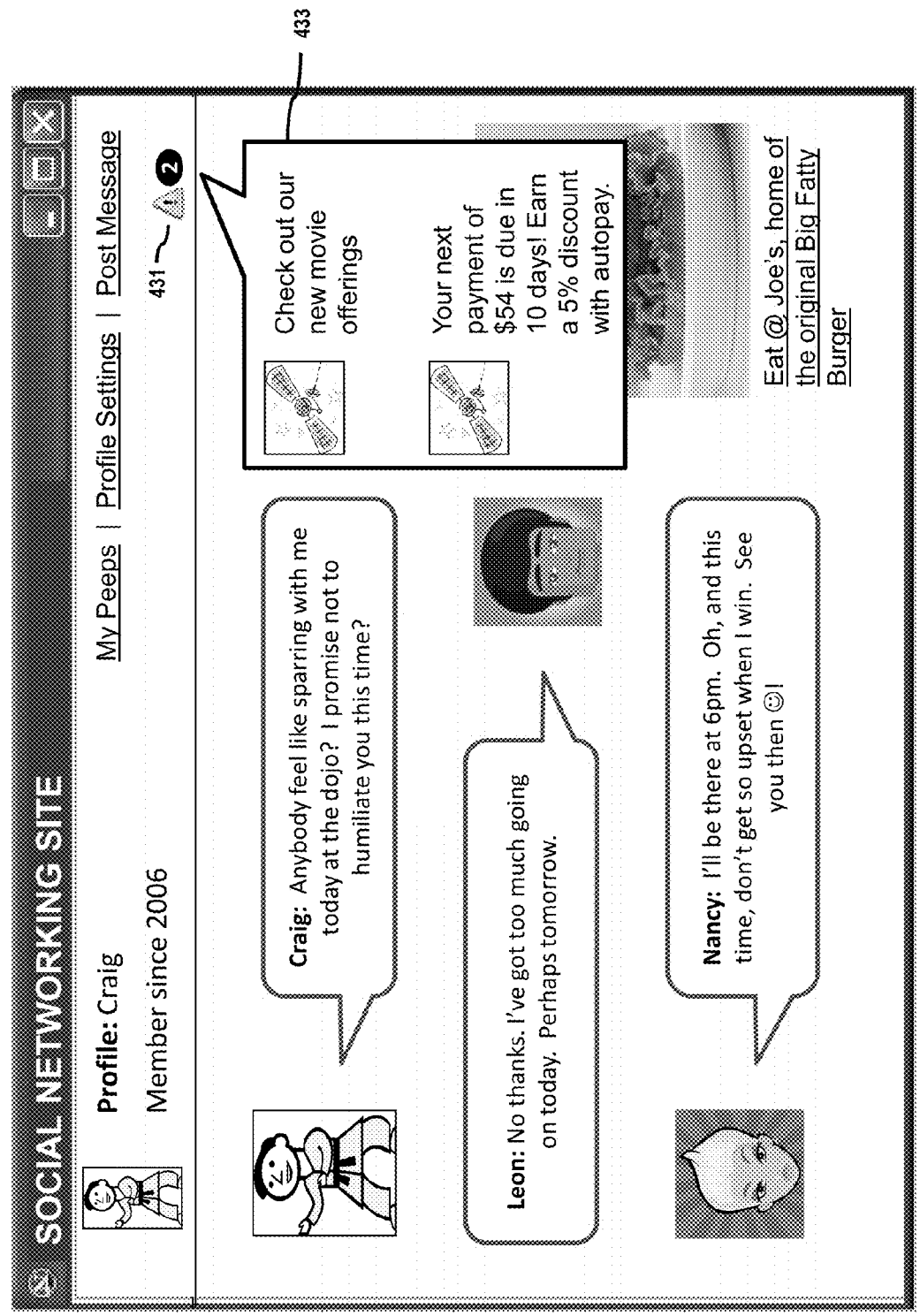

In FIG. 4D, the user is able to receive and view notification messages, or alerts thereof, as sent by the communication service provider. Under this scenario, the user is presented with an icon 431 for indicating that one or more notification messages are available for view directly from the user interface of the social networking service. When the user selects the icon 431 (e.g., clicks), this causes a rendering of a window 433 or frame for presenting the notification messages. Per this example, the notification messages pertain to a new service offering as well as a message for indicating account payment and discount details. The user may select either of the messages, which may further cause invocation of an additional website or browser window pertaining to the message. It is noted that the user is able to view the notification messages during any moment in which they are logged in to the social networking service.

Figure 4E:
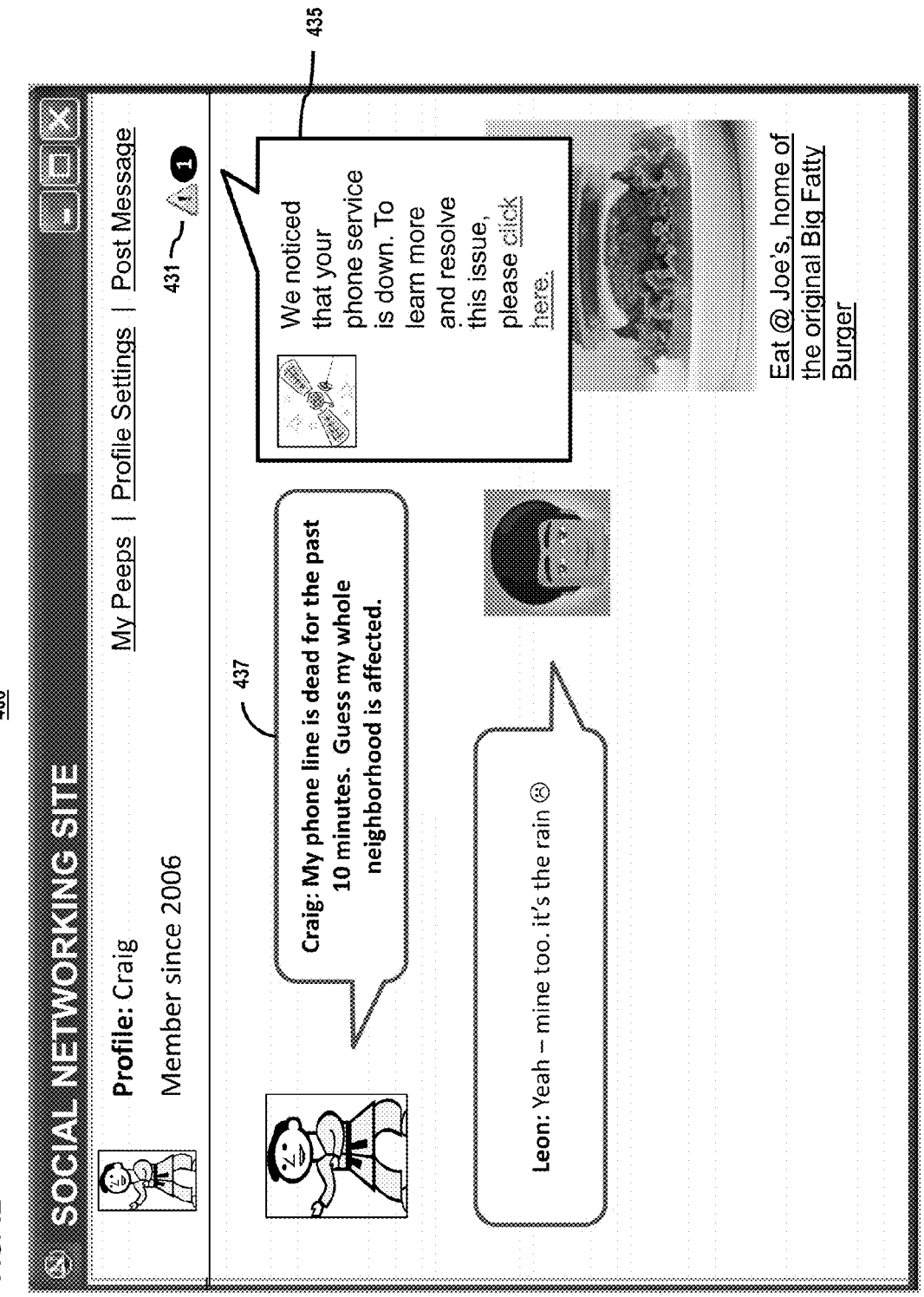

In FIG. 4E, the notification message pertains to a service related issue. Under this scenario, the message is generated and subsequently pushed to the user proactively, such as in response to determined network problems. It is further contemplated that the proactive alert message 435 may be provided in response to messaging activity of the user relative to a determined network issue. Hence, per this scenario for example, when the user generates a post 437 referring to a problem they are experiencing with the network provider, this may be provided as feedback to the integration platform 103. Based on this feedback, the number of other posts related to the same issue, an amount of time between such posts, error message data, etc., the integration platform 103 may prompt the push notification service 110 to transmit the notification message 435. It is noted the criteria for pushing the proactive troubleshooting message 435 may vary from one service provider to the next.

The processes described herein for delivery and presentment of service provider notification messages to a subscribed user via a social networking service of the user may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
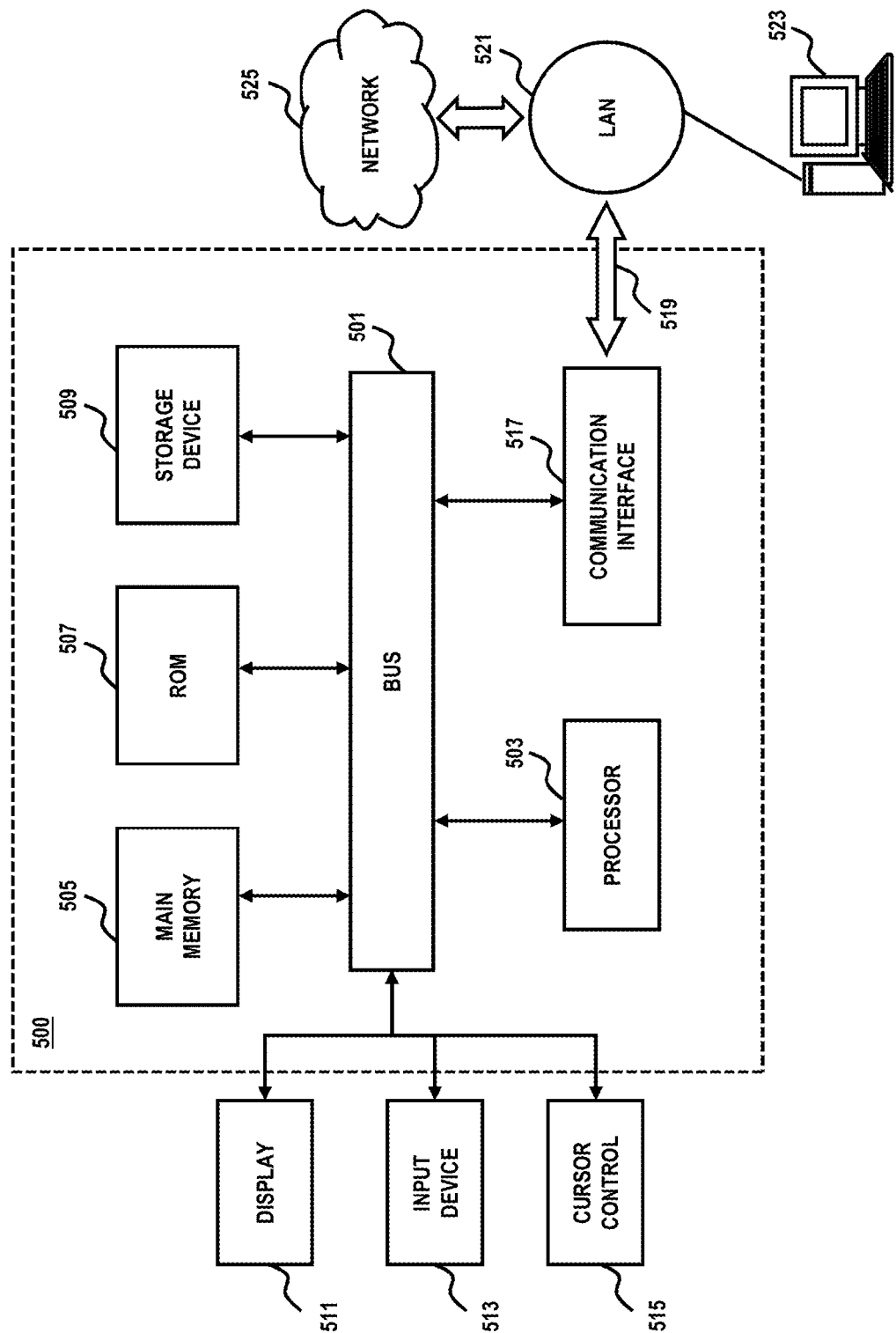
FIG. 5 is a diagram of a computer system that can be used to implement various exemplary embodiments.
Figure 6:
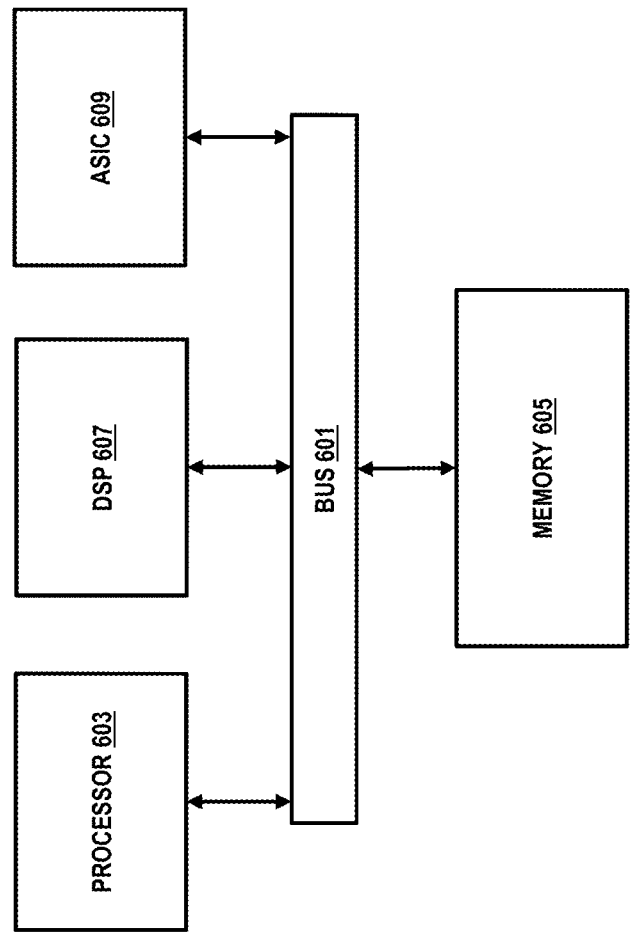
FIG. 6 is a diagram of a chip set that can be used to implement an embodiment of the invention.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4D, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to deliver and present service provider notification messages to a subscribed user via a social networking service of the user as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of delivery and presentment of service provider notification messages to a subscribed user via a social networking service of the user.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to deliver and present service provider notification messages to a subscribed user via a social networking service of the user. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining whether a network identifier for accessing a social networking service via a communication network is associated with subscriber account information maintained by a communication service provider providing, to a subscriber, access service to the communication network;
   generating, via the social networking service, a request for linking a social networking identifier associated with the social networking service with the subscriber account information based on the determination;
   initiating a rendering of a notification message received from the communication service provider to a user interface of the social networking service based on acceptance of the request;
   determining, via the user interface, an input for accepting or rejecting the request; and
   updating the subscriber account information based on the input for accepting the request;

wherein the access service to the communication network and the social networking service are distinct services, wherein the input is received in association with the social networking identifier, and wherein the input is associated with an opt-in procedure associated with the communication service provider.

2. A method of claim 1, further comprising:

determining, based on the subscriber account information, a notification service associated with the communication service provider; and subscribing the social networking identifier with the notification service, wherein the notification messages are transmitted by the notification service to the social networking service based on the subscription.

3. A method of claim 1, further comprising:

determining, via the user interface, an input for selecting a social application associated with the communication service provider, wherein the social application includes one or more application programming interfaces for supporting the rendering of notification messages via the user interface, a rendering of an alert for indicating the availability of the notification messages via the user interface, or a combination thereof.

4. A method of claim 1, wherein the linking of the social networking identifier with the subscriber account is based on the updating of the subscriber account information.

5. A method of claim 1, wherein the updated subscriber account information is retrieved automatically in response to a subsequent activation of the social networking service.

6. A method of claim 1, wherein the social networking identifier is used to login to the social networking service.

7. A method of claim 1, further comprising:

determining, via the user interface, an input for selecting to unlink the social networking identifier associated with the subscriber account information, wherein the input is associated with an opt-out procedure associated with the communication service provider.

8. A method of claim 1, wherein the notification messages include a bill reminder, a service offering, an account notice, a service alert, an event notice, a pro-active troubleshooting advice/alert, or a combination thereof associated with the communication service provider.

9. An apparatus comprising:

at least one processor; and at least one memory including computer program code for one or more programs, the at least one memory and the computer program code configured to, with the at least one processor, cause the apparatus to perform at least the following, determine whether a network identifier for accessing a social networking service via a communication network is associated with subscriber account information maintained by a communication service provider providing, to a subscriber, access service to the communication network, generate, via the social networking service, a request for linking a social networking identifier associated with the social networking service with the subscriber account information based on the determination, initiate a rendering of a notification message received from the communication service provider to a user interface of the social networking service based on acceptance of the request, determine, via the user interface, an input for accepting or rejecting the request, and update the subscriber account information based on the input for accepting the request, wherein the access service to the communication network and the social networking service are distinct services, wherein the input is received in association with the social networking identifier, and wherein the input is associated with an opt-in procedure associated with the communication service provider.

10. An apparatus of claim 9, wherein the apparatus is further caused to:

determine, based on the subscriber account information, a notification service associated with the communication service provider; and subscribe the social networking identifier with the notification service, wherein the notification messages are transmitted by the notification service to the social networking service based on the subscription.

11. An apparatus of claim 9, wherein the notification messages include a bill reminder, a service offering, an account notice, a service alert, an event notice, a pro-active troubleshooting advice/alert, or a combination thereof associated with the communication service provider.

12. An apparatus of claim 9, wherein the apparatus is further caused to:

determine, via the user interface, an input for selecting a social application associated with the communication service provider, wherein the social application includes one or more application programming interfaces for supporting the rendering of notification messages via the user interface, a rendering of an alert for indicating the availability of the notification messages via the user interface, or a combination thereof.

13. An apparatus of claim 9, wherein the linking of the social networking identifier with the subscriber account is based on the updating of the subscriber account information.

14. An apparatus of claim 9, wherein the updated subscriber account information is retrieved automatically in response to a subsequent activation of the social networking service.

15. An apparatus of claim 9, wherein the social networking identifier is used to login to the social networking service.

16. An apparatus of claim 9, wherein the apparatus is further caused to:

determine, via the user interface, an input for selecting to unlink the social networking identifier associated with the subscriber account information, wherein the input is associated with an opt-out procedure associated with the communication service provider.

* * * * *